March 24, 1936. N. E. McLOON 2,034,952
LIME KILN
Filed Jan. 21, 1935 2 Sheets-Sheet 1

Inventor
Nelson E. McLoon
by Rippey & Cassidy
His Attorneys.

March 24, 1936.   N. E. McLOON   2,034,952
LIME KILN
Filed Jan. 21, 1935   2 Sheets-Sheet 2
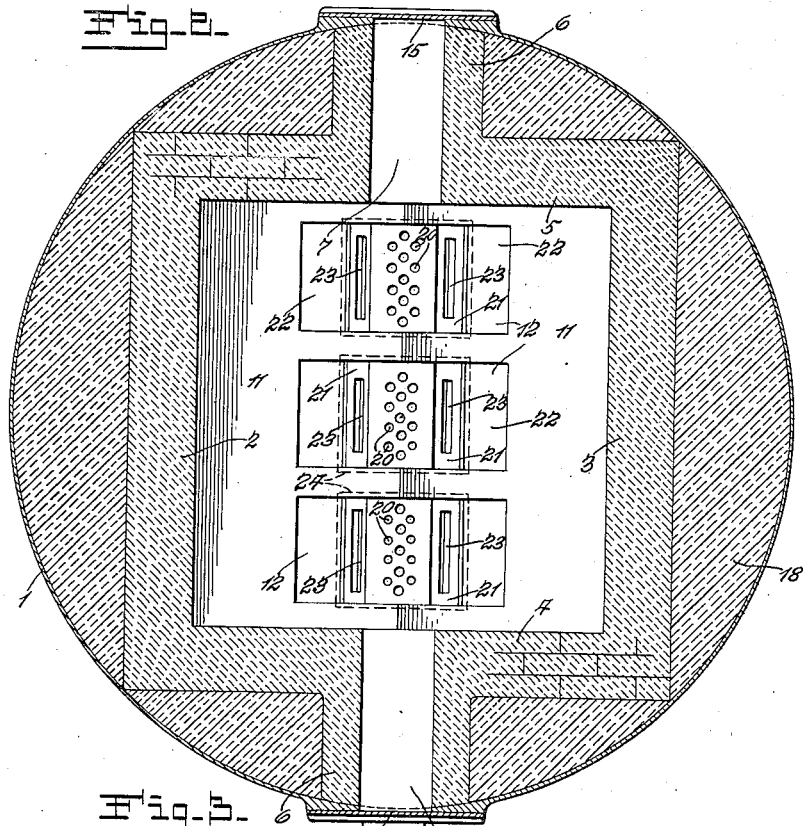
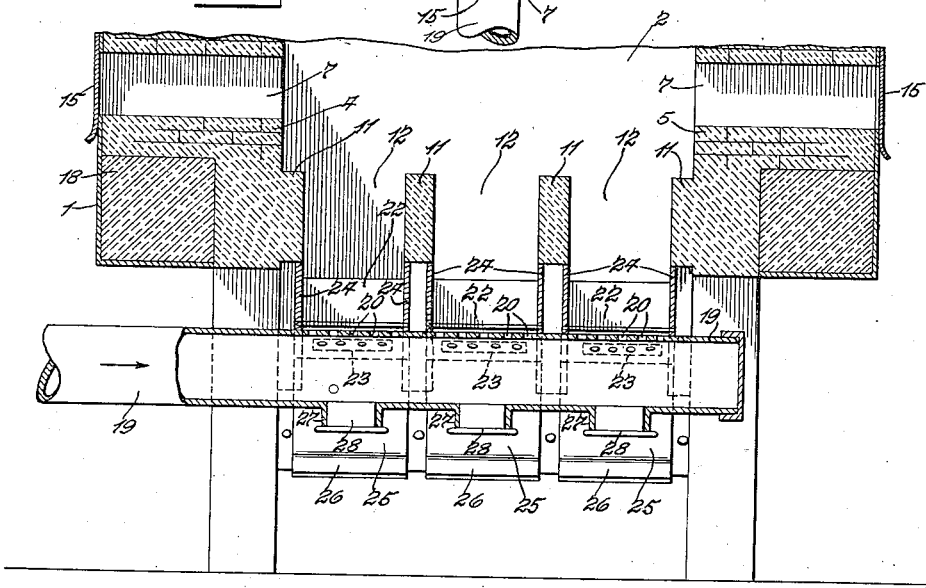
Inventor
Nelson E. McLoon
by Rippey & Cassidy
His Attorneys.

Patented Mar. 24, 1936

2,034,952

UNITED STATES PATENT OFFICE 2,034,952

LIME KILN

Nelson E. McLoon, Glencoe, Mo.

Application January 21, 1935, Serial No. 2,623

5 Claims. (Cl. 263—29)

This invention relates to lime kilns.

An object of the invention is to provide a lime kiln of improved construction and including novel and improved features for calcining the limestone rapidly and for discharging the lime from the kiln.

Another object of the invention is to form the bottom of the lime kiln with downwardly diverging walls having openings through the upper portions thereof through which the calcining flames enter the central portion of the kiln, and to provide openings through the walls of the kiln through which rods may be extended into the kiln to agitate and prevent the limestone from becoming lodged or wedged.

Another object of the invention is to provide an improved burner for the fuel used in calcining the limestone.

Other objects will be readily apparent from the following description, reference being made to the annexed drawings, in which—

Fig. 2 is a cross sectional view approximately on the line 2—2 of Fig. 1.

Fig. 3 is a vertical sectional view approximately on the line 3—3 of Fig. 1.

Figure 1:
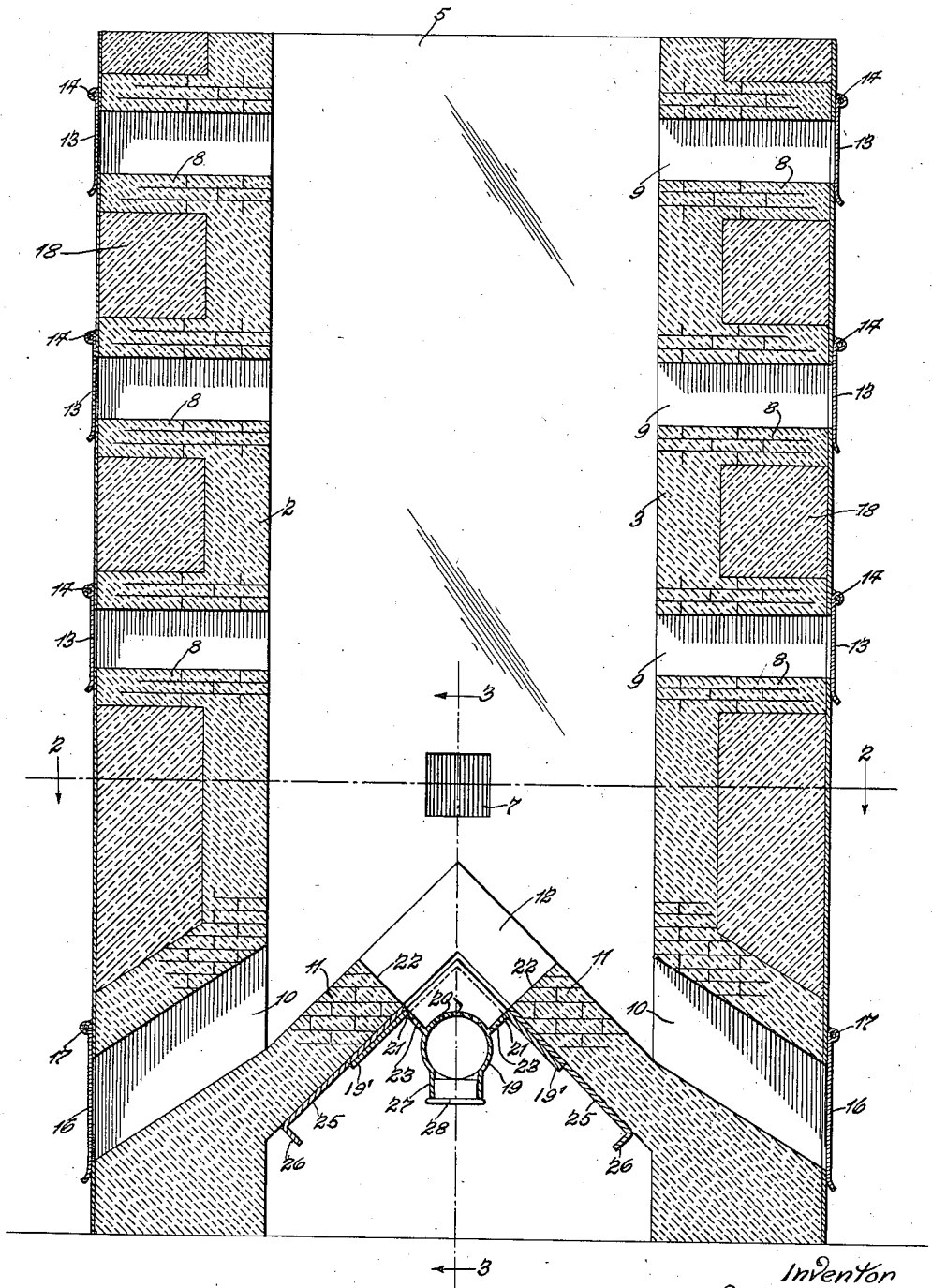
Fig. 1 is a vertical diametrical sectional view of my improved lime kiln.

My improved lime kiln comprises a vertical approximately cylindrical metallic wall 1 in which the refractory kiln walls 2, 3, 4 and 5 form the space in which the limestone is confined during the calcining process. The walls 2, 3, 4 and 5 form a compartment that is approximately rectangular in cross section, although this arrangement may be varied without departure from the nature of the invention. Said walls, 2, 3, 4 and 5 may be constructed of refractory brick or other appropriate refractory material. The walls 4 and 5 have laterally extended portions 6 which extend to contact with the metallic cylindrical wall 1, and openings 7 are formed through said laterally extended portions and through the walls 4 and 5 into the kiln. Similar portions 8 extend from the walls 2 and 3 to contact with the metallic cylindrical wall 1 and have openings 9 communicating with the inside of the kiln. The openings 7 and 9 permit any appropriate rod or poker device to be shoved into the limestone contained in the kiln in order to cause the limestone to continue to move downwardly when the lower portion of the limestone becomes calcined and the lime is discharged from the kiln through passages 10 at the bottom of the kiln.

The bottom of the kiln comprises downwardly diverging refractory walls 11, the upper surfaces of which are in approximate continuation of the bottom walls of the passages 10, so that the lime will slide along the bottom walls 11 into and through the passages 10. The upper portions of the walls 11 are formed with a number of openings 12, which are of less width than the width of the kiln.

Closure doors 13 are provided for the openings 9, said doors being mounted on pivots 14, so that the doors normally close said openings and confine the heat within the kiln but may be opened to permit the use of a rod or poker to agitate the limestone. Similar doors 15 mounted in a similar manner are provided for the openings 7, and doors 16 are provided for the passages 10 and are mounted on pivots 17.

The space between the wall 1 and the kiln walls 2, 3, 4 and 5 is filled with appropriate incombustible insulating material 18, which satisfactorily cooperates with the kiln walls proper to confine the heat in the kiln.

A burner device 19 extends below and approximately parallel with the walls 11 and is located below the holes 12. The burner device is of tubular form and has series of holes 20 through the upper portion thereof and below the openings 12. The tubular burner device has walls or flanges 21 diverging upwardly in approximate alinement with the lower walls 22 of the openings 12. These walls or flanges 21 connect with the tubular burner 19 at opposite sides of the series of holes 20 and have holes 23 through which a rod or poker may be projected to loosen and cause outflow of any lime or other accumulations in the space above said flanges, and which also admit air into said space.

Walls 24 extend upwardly from connection or contact with the tubular burner 19 and with the walls or flanges 21 to contact with the under surfaces of the walls 11 between the openings 12. Thus, the walls 24 with the associated parts described form a combustion chamber for each series of holes 20.

Slides 25 are supported by the guide flanges 19' and may be moved upwardly to close any of the openings 12 or to vary the size of any of said openings. The lower ends of the slides 25 are provided with downwardly extended portions 26 that constitute handles for engagement to move the slides to their different adjusted positions.

Below each series of holes 20 the tubular burner 19 is provided with a downwardly extended portion 27, each of which is equipped with a removable closure 28. The closures 28 telescope into the tubular extensions 27 and are supported by frictional engagement and may be detached to permit any deposits to be removed from within the burner 19.

This improved kiln is highly satisfactory and may be constructed at permissible cost and operated and used with greater facility than kilns of ordinary construction. The parts may be arranged otherwise than in the particular relationship described without departure from the principle and nature of the invention.

I claim:

1. In a lime kiln having upstanding walls forming an enclosure in which the limestone is calcined, upwardly converging bottom walls for said enclosure forming a space between their under sides and having openings approximately midway between opposite sides of the kiln, a tubular burner supported in said space below said openings and having a series of fuel holes below each opening, and walls extending upwardly from said burner toward said bottom walls at the sides of said holes and having holes therethrough for the passage of air and a poker or the like.

2. In a lime kiln having upstanding walls forming an enclosure in which the limestone is calcined, upwardly converging bottom walls for said enclosure forming a space between their under sides and having an opening approximately midway between opposite sides of the kiln, a burner supported in said space below said opening and having a series of fuel holes below said opening, and walls extending upwardly from connection with said burner toward said bottom walls at the sides of said holes and cooperating with said burner and with the walls of said openings to form a combustion chamber and certain of said walls that form said combustion chamber having holes therethrough for the passage of air into said combustion chamber.

3. In a lime kiln having upstanding walls forming an enclosure in which the limestone is calcined, upwardly converging bottom walls for said enclosure forming a space between their under sides and having an opening approximately midway between opposite sides of the kiln, a burner supported in said space below said opening and having a series of fuel holes below said opening, and walls extending upwardly from connection with said burner toward said bottom walls at the sides of said holes and cooperating with said burner and with the walls of said openings to form a combustion chamber and certain of said walls that form said combustion chamber having holes therethrough for the passage of air into said combustion chamber, said burner having an opening in its underside below said fuel holes and a removable and replaceable closure for said last named opening.

4. In a lime kiln having upstanding walls forming an enclosure in which the limestone is calcined, upwardly converging bottom walls for said enclosure forming a space between said undersides and having an opening approximately midway between opposite sides of the kiln, walls forming a combustion chamber below said opening and having holes for admitting air to said combustion chamber, a burner having fuel holes opening into said combustion chamber, and devices supported and guided by certain of said last named walls for varying the size of said opening through said bottom walls.

5. In a lime kiln having upstanding walls forming an enclosure in which the limestone is calcined, upwardly converging bottom walls for said enclosure having openings approximately midway between opposite sides of the kiln, walls cooperating with said bottom walls to form a combustion chamber below each of said openings, a tubular burner connected with said last named walls below said openings and having a series of fuel holes opening into each of said combustion chambers, and means supported and guided by said last named walls for varying the size of said openings respectively.

NELSON E. McLOON.